Aug. 28, 1951     G. LEHMANN     2,566,086
FISHING VESSEL
Filed Feb. 23, 1950
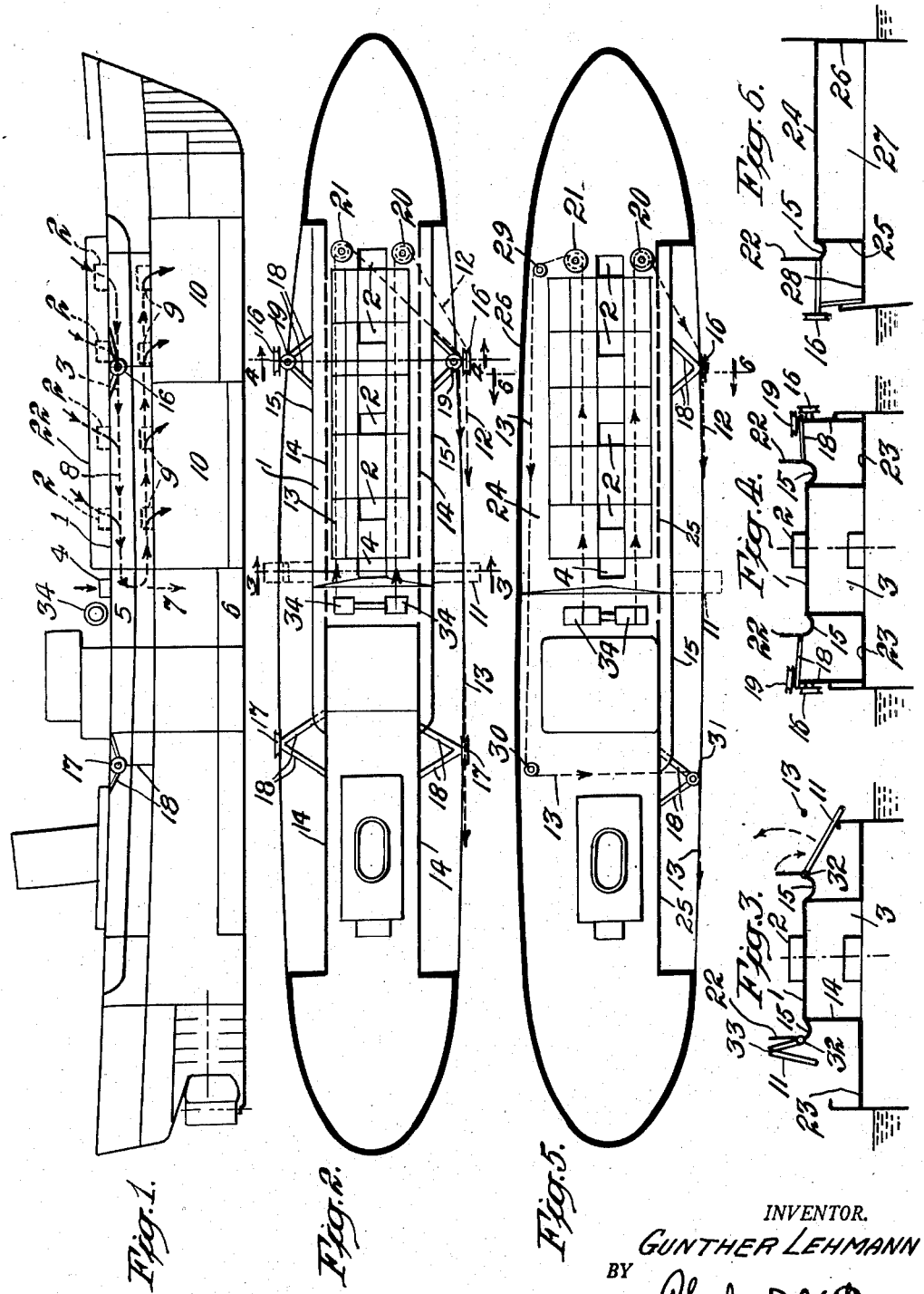
INVENTOR.
GUNTHER LEHMANN
BY
ATTORNEY Patented Aug. 28, 1951

2,566,086

UNITED STATES PATENT OFFICE 2,566,086

FISHING VESSEL

Günther Lehmann, Yonkers, N. Y.

Application February 23, 1950, Serial No. 145,871
In Germany October 21, 1948

1 Claim. (Cl. 114—0.5)

The invention here disclosed is a fishing vessel having net handling and fish processing equipment.

Objects of the invention primarily are to provide in a ship of this sort, clear net-handling deck space at a low level near water level, free from running net ropes; to provide open deck space at a higher level above and to the side of the net-working space, for the landing and unloading of the nets and close association and communication of this clear net-unloading space with the processing equipment; proper enclosure of the processing machinery in a protected working space closely adjoining the open, net-unloading deck and, in general, the stabilizing of trawling operations.

The operation of a fish factory vessel requires, first of all, that the machines for the processing of the fish be arranged in a closed space favorably situated from an operational standpoint, protecting the valuable machines from injury by the sea and the weather and, at the same time, assuring proper working condition for the crew.

Secondly, the factory vessel should itself trawl the fishing net and be able to take the catch aboard in a customary or approved manner.

The arrangement of the fish processing machinery in a closed space suitably related to the fish hold, leads to the suggestion of the construction of shelter-deck fishing vessels. While this has been proposed, the shelter-deck fishing vessel has not been accepted in deep sea fishing due to the fact that the increased height of the shelter-deck vessel above water level makes net work difficult or impossible in the hauling in and setting out operations and renders the shelter-deck vessel impractical as a self-trawling fishing boat. Increased height of the net working platform above water level is to be avoided in all events for fishing boats. Therefore, in a new type of fishing vessel first consideration must be given this need that the net work be carried out from a deck lying only slightly above the water.

To meet the needs of easy net operation, the requirement for a working space for the fish factory equipment and in a favorable position for transportation and processing of the fish from the net through the fish factory to the fish holds, the present invention proposes to construct fishing vessels in accordance with the trunk-deck design of vessel. This trunk-deck form of self-trawling fishing vessel is a new and important contribution to the art.

The trunk-deck fishing vessel proposed by the present invention avoids the great drawbacks inherent in the shelter-deck fishing vessel. The trunk-deck fishing vessel possesses, first of all, the necessary working space, enclosed on all sides and located over the fish hold, and further makes possible, due to the free deck surface, in addition to the trunk, of the principal deck, the accomplishing of the net work for hauling in and setting out, as practiced with customary one-deck fishing vessels of low freeboard.

This new trunk-deck fishing boat thus fulfills the two principal requirements of a fish factory vessel in a technically perfect manner, namely: a closed working space and unhindered net work which can be carried out according to best approved practice.

Inasmuch as the net work, generally speaking, is only effected on one side of the ship, it is further proposed as a part of this invention, to construct the superstructure deck in the manner of a trunk only on one side of the ship and to carry the superstructure deck on the other side out to the outer plating in the manner of a shelter-deck.

By this novel construction of combining the features of a trunk-deck vessel with features of a shelter-deck vessel, there is provided an incomplete shelter-deck vessel, which might be termed a semi-shelter-deck vessel, permitting the net work to be carried out as prescribed, at the side of the vessel on a deck only a short distance above the water, and at the same time affording a large factory space extending to the other side of the ship for the housing of the fish machinery, deep-freeze plant and the like, a space considerably larger than would be a normal trunk.

The design of ship last discussed as the salient part of the invention, the semi-shelter-deck fishing vessel, combines the advantages of the conventional single deck, full-scantling fishing vessels with respect to easy net work, with the advantages of the shelter-deck fishing vessels in regard to placing of fish machinery and crew in a closed working space protected from the sea and weather.

The provision of a trunk or semi-shelter-deck on the main deck assures further advantages for fishing vessels. By the transfer of the catch to the trunk-deck or semi-shelter-deck, the catch is protected from breaking seas and will not, in the event of stormy weather, be washed back into the sea. Furthermore, the crew can prepare the catch on the trunk-deck or semi-shelter-deck, which surface is an assorting and cutting deck, unhindered by the wash of the sea.

The provision of a trunk or semi-shelter-deck prevents the accumulation of large quantities of water on deck, as was previously the case with full-scantling fishing vessels, and therefore has a favorable effect on the stability of the ship in heavy weather. Furthermore, a larger reserve buoyancy is available. Trunk-deck or semi-shelter-deck fishing boats therefore require lesser metacentric height than previous full-scantling fishing boats. The lesser metacentric height in the trunk-deck or semi-shelter-deck fishing boats is imparted as a matter of course to parts of the ship, for example, the heavy fishing net winch arranged higher on the trunk or semi-shelter-deck than in a full-scantling fishing vessel. As a consequence the roll of the ship is more gentle or less violent than full-scantling vessels, with resulting beneficial effect on all the work on board.

The invention is illustrated by way of example in the accompanying drawing forming part of this specification.

In this drawing,

Fig. 1 is a diagrammatic side elevation of a trunk-deck or semi-shelter-deck form of fishing vessel embodying the invention;

Fig. 2 is a top plan diagrammatic representation of the trunk-deck fishing vessel;

Figs. 3 and 4 are broken cross sectional diagrammatic views on substantially the planes of lines 3—3 and 4—4, respectively, of Fig. 2;

Fig. 5 is a diagrammatic plan view of a semi-shelter-deck fishing vessel embodying the invention;

Fig. 6 is a cross sectional diagram on substantially the plane of line 6—6 of Fig. 5.

The vessels shown are designed for carrying out all fishing operations and for preparation of fish fillets, fish meal and oil, as well as for drying of fish.

The catch is emptied from the net onto the trunk-deck or semi-shelter deck and there assorted and cut.

The fish to be processed are passed through hatches 2 of trunk-deck or semi-shelter-deck 1 into the processing space 3 located in the trunk.

The scraps and liver pass through hatches 4 into space 5 for transformation into fish meal or liver oil. The train and fish oil tanks are located below space 5. The storage hold 7 for the fish meal is located directly below space 5.

The fish which are boned, beheaded and flayed, by machine or by hand in working space 3, are passed or conveyed as shown by arrow 8 to space 5, wherein the packing machines are located. The bones and head portions pass, as shown by arrow 8, from the working space 3 into space 5, where they are transformed into fish meal.

The fish which have been transformed in working spaces 3 and 5 into deep-frozen packed fillets, ready for use in the kitchen, are passed by any suitable known conveyor means in the direction of arrow 9 from the working space 5 into the insulated, cold storage hold 10.

The fish scrap from the cutting, not utilized for fish meal, is washed overboard from the trunk-deck or semi-shelter deck 1 through scuppers 11. These scuppers, as shown in Fig. 3, are hingedly mounted at 32 so that they may be drawn back to not interfere with the net work.

Furthermore, as shown in Fig. 3, the scuppers or chutes 11 are divided and arranged to be hinged at the center, at 33, so that they may swing inward away from the trawl warp or drag line 13.

To facilitate the floating or washing away of the fish scrap from the trunk-deck or semi-shelter-deck to the chutes 11, leading outboard, the inner, stationary portions 15 of the trunk-deck or semi-shelter-deck, overlapping the trunk walls 14, are in the form of gutters or scuppers.

The fore and aft gallows rolls 16, 17, for the guiding of the fore and aft drag lines 12, 13, are mounted on outriggers 18 carried by the trunk walls 14 at the level of the trunk-deck 1.

For the guiding of the aft drag line 13, the outrigger supports 18 carry within the area of the fore gallows roll 16, a horizontal roll 19 directed toward the center of the ship. The change of direction of the drag lines 12, 13, is effected over inboard rolls or blocks 20, 21, to the winches 34 located amidships, all at substantially the same trunk-deck level.

In order to reduce the hoisting height of the net when transferring the catch onto the trunk-deck 1, the railings or bulwarks 22 of the trunk-deck or semi-shelter-deck are hinged at 32 to swing downward out of the way, as indicated by the broken arrow, Fig. 3.

Figs. 5 and 6 illustrate the invention embodied in a semi-shelter-deck form of fishing vessel.

The catching and processing is effected in this design in the same manner as first described.

The semi-shelter-deck 24 extends from the side wall 25, built in the manner of a trunk, to the outer plating 26 at the opposite side of the ship, providing extension of the fish factory space 27.

The net work is effected from the part 28 of the main deck lying next to the fish factory space 27.

The drag lines are so guided in the semi-shelter-deck fishing vessel that the fore drag line 12, as previously, is led over the reversing roll 20 to the fore gallows roll 16, and the drag line leading to the aft gallows is led over the reversing rolls 21, 29, 30, along the outboard side of the semi-shelter-deck astern to the gallows roll 31.

In both forms of the invention the working platforms, 23 in Figs. 3 and 4 and 28 in Fig. 5, are clear and free of running ropes and the drag lines are kept at the same level, without vertical travel.

The enclosed working space beneath the trunk-deck or semi-shelter-deck and the cold storage fish holds beneath the same are in the amidships portion of the vessel where the pitching effect is least and working conditions are best for the fish processing operations.

What is claimed is:

A semi-shelter-deck fishing and fish processing ship having a low, open, net-handling deck, close to water level and providing a stable, low level, accessible working platform for handling the nets and having an additional open, net-unloading deck above said net-handling deck providing a wide platform for net-unloading and catch slaughtering purposes, said net-unloading deck extending from a side of the ship inwardly and terminating at a point short of the other side of the ship, in a zone along the major portion of the length of the ship, a trunk wall extending from the inner edge of said net-handling deck generally vertically to said second mentioned deck, and a second wall extending generally vertically between said decks and along said first mentioned side, thereby providing net-handling space along said first mentioned deck and fish handling space on the deck thereabove, hatchways in said second mentioned deck to afford access to the space therebelow, gallows at the outer edge of the net-handling deck and approximately at the level of the fish handling deck for keeping the net-handling deck clear of net ropes, bulwark elements along the side of the ship and extending above the fish handling deck, and drainage means in said fish handling deck to control the weight of water thereon to aid in stabilizing the ship.

GÜNTHER LEHMANN.

REFERENCES CITED

The following references are of record in the file of this patent:

UNITED STATES PATENTS

| Number | Name | Date |
|---|---|---|
| D. 140,505 | Hannevig | Mar. 6, 1945 |
| 1,115,752 | Vick | Nov. 3, 1914 |
| 2,377,693 | Johnson | June 5, 1945 |
| 2,413,918 | Harris | Jan. 7, 1947 |

FOREIGN PATENTS

| Number | Country | Date |
|---|---|---|
| 11,280 | Great Britain | of 1886 |
| 20,943 | Great Britain | Nov. 22, 1897 |